(12) United States Patent
Elmaanaoui

(10) Patent No.: US 10,782,117 B2
(45) Date of Patent: Sep. 22, 2020

(54) OPTICAL DELAY LINE FOR COHERENCE IMAGING

(71) Applicant: Canon U.S.A., Inc., Melville, NY (US)

(72) Inventor: Badr Elmaanaoui, Belmont, MA (US)

(73) Assignee: Canon U.S.A., Inc., Melville, NY (US)

( * ) Notice: Subject to any disclaimer, the term of this patent is extended or adjusted under 35 U.S.C. 154(b) by 139 days.

(21) Appl. No.: 16/119,818

(22) Filed: Aug. 31, 2018

(65) Prior Publication Data

US 2019/0086192 A1 Mar. 21, 2019

Related U.S. Application Data

(60) Provisional application No. 62/552,704, filed on Aug. 31, 2017.

(51) Int. Cl.
*G01B 9/02* (2006.01)

(52) U.S. Cl.
CPC ....... *G01B 9/02032* (2013.01); *G01B 9/0203* (2013.01); *G01B 9/02004* (2013.01); *G01B 9/02027* (2013.01); *G01B 9/02091* (2013.01); *G01B 2290/35* (2013.01)

(58) Field of Classification Search
CPC ............ G01B 9/02004; G01B 9/02032; G01B 9/02064; G01B 9/02091; G01B 2290/35
See application file for complete search history.

(56) References Cited

U.S. PATENT DOCUMENTS

| 6,657,727 | B1* | 12/2003 | Izatt | G01N 21/4795 356/450 |
| 8,947,672 | B2 | 2/2015 | Schmoll et al. | |
| 2012/0188555 | A1* | 7/2012 | Izatt | G01B 9/02078 356/479 |
| 2014/0029015 | A1* | 1/2014 | Schmoll | H01S 3/1068 356/497 |

(Continued)

OTHER PUBLICATIONS

Bradu, Adrian et al. "Master/slave interferometry—ideal tool for coherence revival swept source optical coherence tomography". Biomedical Optics Express, vol. 7, No. 7, Jul. 1, 2016, pp. 2453-2468. (Year: 2016).*

(Continued)

*Primary Examiner* — Michael A Lyons
(74) *Attorney, Agent, or Firm* — Canon U.S.A., Inc., IP Division

(57) ABSTRACT

An optical coherence tomography (OCT) system comprises an interferometer configured to generate interference light based on interference between a reference beam and a sample beam with which a sample has been irradiated. A detector operates to detect intensities of the interference light and/or one or more interference patterns; a processor is configured measure a signal falloff of the intensity of the interference light and/or the one or more interference patterns; and an optical delay line configured to adjust an optical path difference according to the signal falloff so as not substantially introduce artifacts to an image of the sample. In one embodiment, the optical delay line includes (Continued)

a main reflector consisting of a mirror and a Faraday rotator; the Faraday rotator is placed between the n and n+1 coherence revival modes of the interferometer, where n is greater than or equal to 1.

19 Claims, 11 Drawing Sheets

(56) References Cited

U.S. PATENT DOCUMENTS

| | | | |
|---|---|---|---|
| 2017/0105618 A1 | 4/2017 | Schmoll et al. | |
| 2017/0231493 A1* | 8/2017 | Ohmori | A61B 3/1225 351/208 |
| 2017/0311795 A1* | 11/2017 | Sumiya | G02F 1/2252 |
| 2018/0055355 A1 | 3/2018 | Sarunic et al. | |
| 2018/0353067 A1* | 12/2018 | Moriguchi | A61B 3/102 |

OTHER PUBLICATIONS

Carrasco-Zevallos, et al. "Complex Conjugate Removal in SS Optical Coherence tomography". Optical Coherence Tomography, 2015, pp. 255-276. (Year: 2015).*

Dhalla, Al-Hafeez et al. "Complex conjugate resolved heterodyne swept source optical coherence tomography using coherence revival". Biomedical Optics Express, vol. 3, No. 3, Mar. 1, 2012, pp. 633-649. (Year: 2012).*

Nankivil, Derek et al. "Coherence revival multiplexed, buffered swept source optical coherence tomography: 400 kHz imaging with a 100 kHz source". Optics Letters, vol. 39, No. 13, Jul. 1, 2014, pp. 3740-3743. (Year: 2014).*

Dhalla, A.H. Z., et al, "Development of Extended-Depth Swept Source Optical Coherence Tomography for Applications in Ophthalmic Imaging of the Anterior and Posterior eye", Department of Biomedical Engineering Duke University.

Johnson, B., et al, "Coherence properties of short cavity swept lasers", Biomedical Optics Express, Feb. 1, 2017, vol. 8, No. 2.

* cited by examiner

OPTICAL DELAY LINE FOR COHERENCE IMAGING

CROSS-REFERENCE TO RELATED APPLICATIONS

The present application claims priority benefit from U.S. provisional patent application No. 62/552,704 filed Aug. 31, 2017, the disclosure of which is hereby incorporated by reference herein in its entirety.

BACKGROUND

Field of Disclosure

This application generally concerns interferometric medical imaging devices, and in particular it concerns optical probes for catheters and/or endoscopes used for medical imaging of bodily lumens.

Description of Related Art

Optical Coherence Tomography (OCT) is an optical imaging modality that uses interferometry to acquire images of objects of interest with submicron resolution over depth ranges of several millimeters (mm). OCT uses low-coherence interferometry to measure the depth-resolved intensity of light backscattered from a sample. In time domain OCT (TD-OCT), an OCT system functions as coherence gated interferometer where low coherence light is directed towards and collected from a sample. At the photodetector, light returning from the sample interferes with light returning from a reference arm to form interference fringes. Interference fringes are only observed from the reflector in the sample arm when the optical path length is within a coherence length of the reference arm optical path length. By scanning the reference arm position axially, a series "fringe bursts" can be observed at the photodetector, corresponding to reflectors in the sample arm. After demodulation of the photodetector signal, a depth profile, or A-scan, is recovered with an axial resolution equal to the coherence length of the light source. Changes in the backscattered light intensity generally indicate changes in the refractive index of the sample which correlates with changes in sample's morphology. The resulting high-resolution cross-sectional and volumetric images thus provide high-resolution images of the sample's morphology. As noted above, interference fringes are only observed from reflectors in the sample arm whose optical path length is within the coherence length of the reference path length.

Fourier Domain OCT (FD-OCT) is a technique based on spectral interferometry, and is considered an alternative approach to TD-OCT. In contrast to TD-OCT, in FD-OCT, the reference arm of the OCT interferometer is not scanned, but rather held stationary. Light returning from the sample and stationary reference is combined and the resulting broadband interference pattern is measured with spectrally separated detectors.

FD-OCT can be realized in two ways, which are referred to as spectral-domain OCT (SD-OCT), and swept-source OCT (SS-OCT). In SD-OCT, a broadband source (e.g., a super-luminescent diode or femtosecond laser) is used as the light source, and the photodetector is replaced with a spectrometer. SD-OCT is a form of OCT in which the interferometric signal between a reference beam and the backscattered component of a sample beam reflected from a sample is split into its frequency components by a dispersive device (spectrometer) and collected by an optical detector (e.g., a line camera). In SS-OCT, the broadband source is replaced with a rapidly sweeping laser source that typically has a narrow instantaneous linewidth with a broad tuning bandwidth. A photodetector can still be used in SS-OCT, but these systems will require photodetectors with much higher bandwidth than detectors for TD-OCT.

The collected data contains the spectral information of the backscattered signal. This spectral data can be transformed to the spatial domain to obtain a one-dimensional (1D) spatial distribution, referred to as an A-scan, representative of the scattering properties of the sample. That is, the power spectral density of the interfering light is measured as a function of optical frequency. Due to the Fourier relationship between the autocorrelation function and the power spectral density (the Wiener-Khintchine theorem), the A-scan (depth profile) can then be retrieved by simply taking the inverse Fourier transform of the "spectral interferogram". Scanning the sample beam across the sample produces a series of adjacent A-scans which can then be used to create a two-dimensional (2D) tomogram, also called a B-scan. A volume representation can be acquired by further scanning the sample beam in a third direction (depth) of the sample to collect a series of B-scans that covers the three-dimensional (3D) volume of interest.

Whether using TD-OCT, SD-OCT, or SS-OCT, OCT systems are used for dimensional analysis and measurements, which require a displayed image to correctly represent the detected physical space. Obtaining the correct representation is complicated by varying object refractive indices and by arbitrary depths z of relevant features caused by a length mismatch of the sample path and the reference path. A length mismatch between reference and sample optical paths can occur even when the sample path and the reference path are originally matched, for example, in the case of systems that use imaging probes (e.g., catheters, endoscopes, etc.) because these probes have manufacturing tolerances. Other factors that cause length mismatch include mechanical strain due to intentional motion, manipulation of the interferometer (e.g., in an intravascular OCT system) or a part of the interferometer, thermal effects due to different temperature gradients between the reference arm (exposed to ambient temperatures) and the sample arm (exposed to sample temperatures), and thermal effects due to a difference between body temperature and local ambient temperature when an imaging probe is inserted into a body.

To ensure precise length alignment between the reference and sample arms, one of the path lengths requires the use of an optical delay line (ODL). However, in addition to optical path length mismatch, the imaging accuracy of OCT systems is affected by one or more of optical attenuation, imaging range (limited by the imaging optics), depth-of-focus, and coherence revival, among others. Coherence revival is a phenomenon where interference is observed not only when the reference and sample arm are matched but also when the two arms of the interferometer are mismatched by integer multiples of the laser's cavity length. Coherence revival can be thought of as resulting from the interference of sequential optical waveforms emanating from sequential optical laser cavity roundtrips. As such, for matched reference and sample arm interferometers, interference occurs for all reflections that fall within the coherence window of the system which is now replicated for all integer multiples of the laser cavity length unlike that of standard systems.

Therefore, to more precisely compensate for length mismatch of the sample and the reference optical paths, patent application publication US 2017/0105618 discloses a variable optical delay line (VDL), and to reduce or eliminate coherence revival artifacts U.S. Pat. No. 8,947,672 and patent application publications US 2012/0188555 and US 2018/0055355 disclose the use of dispersion compensating elements in one of the arms. US 2012/0188555 teaches how to take advantage of coherence revival to resolve complex conjugate ambiguity in swept source optical coherence tomography (SS-OCT), thereby doubling the usable imaging range. US 2012/0188555 does not address the issue of coherence revival artifacts, instead it focuses on using the coherence revival signal to effectively double imaging range. U.S. Pat. No. 8,947,672 attempts to address coherence revival artifact by making changes to the optical source (laser design) so as to eliminate or substantially reduce artifacts from the sample arm. The described embodiments make for complex laser designs and potentially reduced coherence length lasers, but U.S. Pat. No. 8,947,672 does not teach optical delay line designs to reduce or eliminate artifacts. Specifically, U.S. Pat. No. 8,947,672 discloses a length adjusting element that continuously changes the physical length of the laser cavity using a-priori information about the system or object being imaged.

In other words, the known art prior to the invention herein does not address noise artifacts caused by coherence revival in the design of optical delay lines.

SUMMARY

In accordance with a least one embodiment, an optical coherence tomography (OCT) system, comprises an interferometer configured to (i) receive and divide light from a light source into a first beam with which an object or sample is to be irradiated and which travels along a sample arm of the interferometer and a second beam which travels along a reference arm of the interferometer, (ii) send the second beam along the reference arm for reflection off of a reference reflector of the interferometer, and (iii) generate interference light by causing the reflected second beam to combine or recombine and/or to interfere with reflected or scattered light of the first beam with which the object or sample has been irradiated, the interference light generating one or more interference patterns; at least one detector that operates to acquire the interference light and/or the one or more interference patterns to measure the interference or the one or more interference patterns between the combined or recombined light; and an optical delay line designed such that it does not substantially introduce artifacts to an image of the object or sample.

In one embodiment, an optical coherence tomography (OCT) system comprises an interferometer configured to generate interference light based on interference between a reference beam and a sample beam with which a sample has been irradiated. A detector operates to detect intensities of the interference light and/or one or more interference patterns; a processor is configured measure a signal falloff of the intensity of the interference light and/or the one or more interference patterns; and an optical delay line configured to adjust an optical path difference between the sample and reference arms of the interferometer. In this embodiment, based on the signal falloff exhibiting coherence revival, the processor controls the optical delay line to adjust the optical path difference so as not substantially introduce artifacts to an image of the object or sample.

In one embodiment, the optical delay line includes a main reflector consisting of a mirror and a Faraday rotator; the Faraday rotator is placed between the n and n+1 coherence revival modes of the interferometer, where n is greater than or equal to 1.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIG. 6A proximal MDL and FIG. 6B distal MDL reflection signals overlaid on system signal and artifact levels; reflection strengths as given by Table 2 and 60 mm offset.

FIG. 8A proximal MDL and FIG. 8B distal MDL reflection signals overlaid on system signal and artifact levels; reflection strengths as given by Table 2 and 100 mm offset.

Figure 1A:
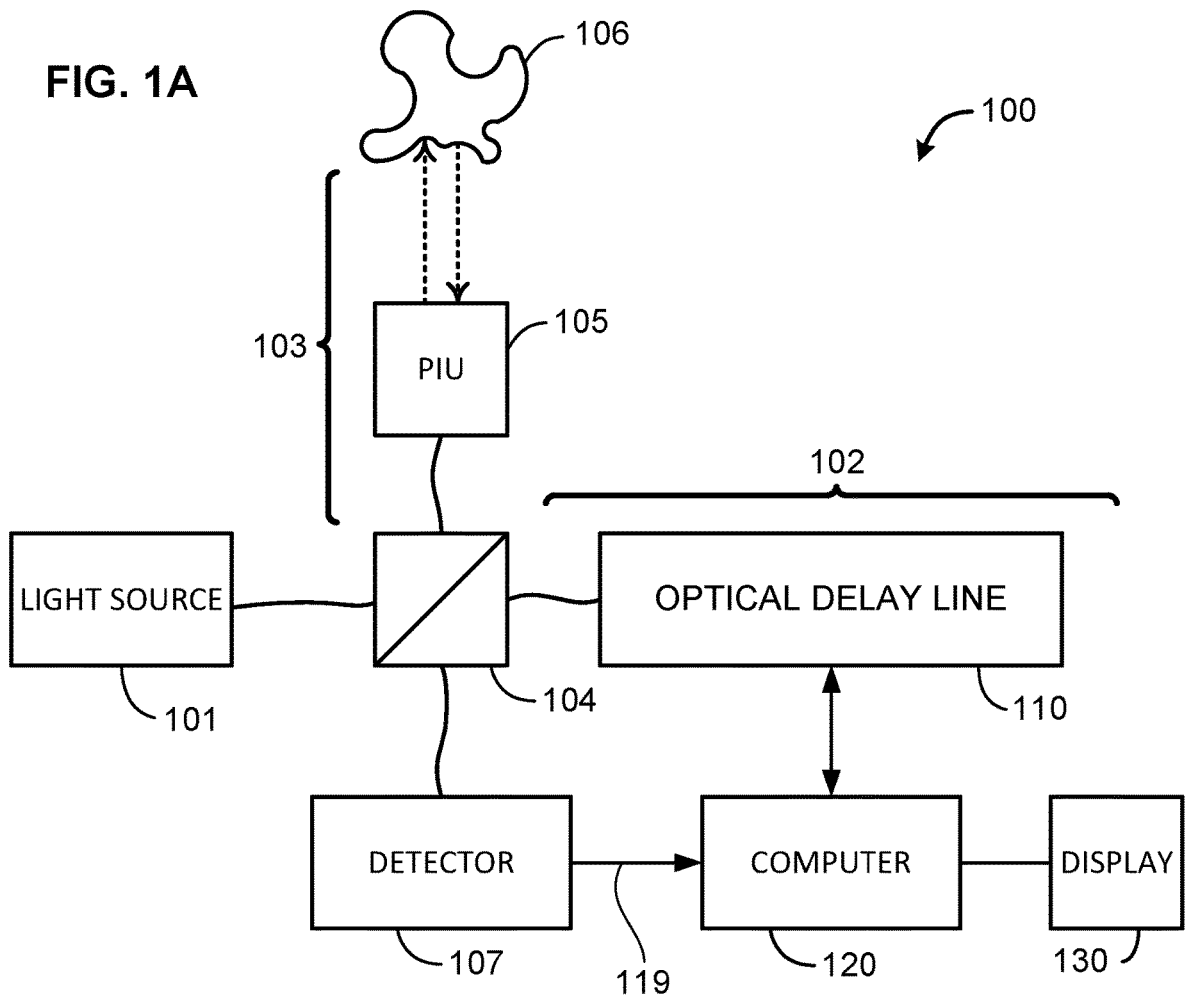
FIG. 1A illustrates an example embodiment of an OCT system.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

New OCT systems operate at faster speeds and are, in many cases, limited by current acquisition and digitization speeds. Faster acquisition speeds lead to larger signal bandwidths, which may restrict the observable imaging depth for the system. An additional factor that may limit observable imaging depth is the need for relatively-high numerical-aperture (NA) optics to obtain good-quality lateral resolution in images. Obtaining good-quality lateral resolution may come at the expense of a smaller depth of field, thus limiting the observable imaging depth. Also, another factor that may limit observable imaging depth is the goal of more-uniform sensitivity throughout the whole observable imaging depth, which, in addition to the limited depth of field of the optics, may be further limited by the coherence length of the light source (e.g., 3 to 20 mm imaging depths). OCT systems may have an observable imaging depth in the range of 1 mm to 25 mm, for example in the range of 5 mm to 8 mm.

FIG. 1A illustrates an example embodiment of an OCT system 100. The OCT system 100 includes a light source 101, an interferometer having a reference arm 102 and a sample arm 103, a beam splitter 104, one or more detectors 107, a computer 120, and a display 130. The light source 101 emits light, and the light source 101 may be a broad-band light source with a short coherence length, for example a superluminescent light-emitting diode (SLED), a tunable light source, and a white-light source. The beam splitter 104 spits the light emitted from light source 101, directs some of the light to the reference arm 102 (forms a reference beam), and directs some of the light to the sample arm 103 (forms a sample beam). The beam splitter 104 can be a fiber-optic beam splitter with a split ratio of 50:50 (±designer tolerance) or any other ratio as appropriate.

The sample arm 103 includes a patient-interface unit (PIU) 105 which connects the interferometer to an optical probe (e.g., a catheter or endoscope), which in turn directs a beam of light (the sample beam) to an object or sample 106. The optical probe includes illumination and collection optics to irradiate the sample 106 with the sample beam and to collect light that is reflected or scattered from the sample 106. This reflected or scattered light is then transmitted through the sample arm 103 back to the beam splitter 104. The reference arm 102 includes an optical delay line 110. The optical delay line 110 includes one or more reflectors of which at least one reflector is a mirror (main reflector). The light (the reference beam) that travels from the beam splitter 104 through the optical delay line 110 is reflected off of the main reflector and travels back to the beam splitter 104. The beam from the sample arm 103 and the beam from the reference arm 102 are recombined by the beam splitter 104, which generates a combined or recombined beam that has an interference pattern (an interference pattern occurs when the reference arm and the sample arm have the same optical length). The recombined beam is detected by the one or more detectors 107 (e.g., photodiodes, photomultiplier tubes, a linear CCD array, an image sensor, a CCD array, a CMOS array).

Figure 1B:
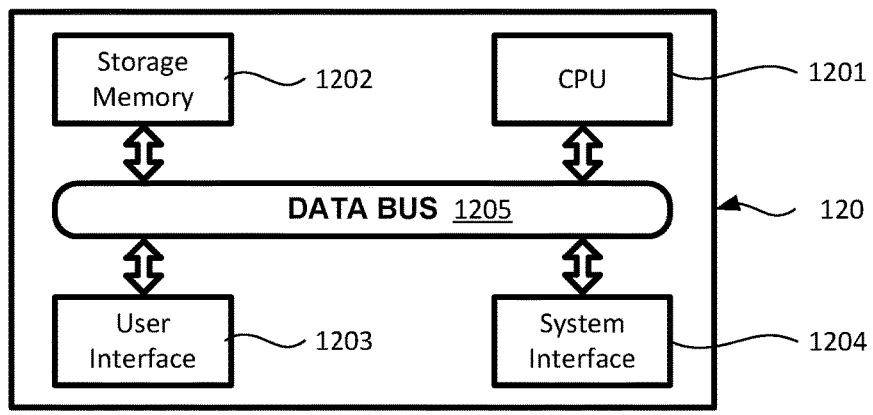
FIG. 1B shows a functional diagram of computer 120 applicable to the OCT probe system 100.

The OCT system is computer controlled by the computer 120 which includes one or more processors (e.g., central processing unit or CPU) and associated circuitry to provide signaling commands for timing and control, and to processes the interferometric data received from detector 107 into images or volumetric data. Specifically, the electrical signals from the detector 107 are transferred to the computer 120 via a cable 119. The computer 120 may contain, in addition to a CPU, for example a field-programmable gate array (FPGA), a digital signal processor (DSP), an application specific integrated circuit (ASIC), a graphic processing unit (GPU), a system on chip (SoC) or a combination thereof, which perform some or the entire image processing and signaling of the OCT system. FIG. 1B shows a schematic block diagram of computer 130 applicable to the various aspects of the OCT system 100 described herein. The computer 120 includes or is operably attached to a display 130 for displaying images of the interference patterns and/or processed data. The sample and reference arms in the interferometer could consist of free-space optics, photonic integrated circuits, fiber-optics or combinations thereof, and the interferometer could have different architectures such as Michelson, Mach-Zehnder, or common-path interferometer designs.

The optical delay line (ODL) 110 in the reference arm 102 has a reference light path that has a length that is equal to, or nearly equal to, the distance of the sample light path in the sample arm 103. Thus, the light from the reference arm 102 can serve as a point of reference for an interferometric analysis of the light from the sample arm 103. Also, a reference light path that is equal to, or nearly equal to, the sample light path ensures that the sample 106 falls within the observable-imaging depth of the system 100.

In some embodiments, the optical delay line 110 is a fixed-length reference coil (e.g., a segment of optical fiber) that is placed in the reference arm 102 to match the reference arm's optical path length to the sample arm's optical path length.

As mentioned in the Background, OCT systems are often used for dimensional analysis and measurements, which require a displayed image to correctly represent the detected physical space. However, the correct representation is complicated by a mismatch between sample arm optical path length and the reference arm optical path length. Factors contributing to the mismatch can include time-varying factors like mechanical strain due to intentional motion and/or manipulation of the interferometer or part of the interferometer like the imaging probe, or thermal effects due to different temperature gradients between reference and sample arms from local ambient temperature changes or differences between body temperature and local ambient temperature when imaging probes are inserted into the body of a patient for imaging.

Thus, some embodiments of OCT systems include an adjustable or variable optical delay line (VDL) 110. The optical delay of a VDL 11o can be adjusted, either manually or automatically using actuated means. For example, the optical delay in some embodiments of an actuated or motorized optical delay line (MDL) can be adjusted by a user input via a graphical user interface or can be adjusted algorithmically with an automatic calibration method that requires little or no user input.

Fiber-based Optic Delay Lines (ODL) have an input and output fiber collimator to project the light into free space and collect it again into a fiber. Fiber delay lines can be transmissive or reflective. The distance the light travels in free space is precisely controlled, either by controlling the separation between the input and output optics, or by reflecting the light off of a movable reflector. In either case, by varying the distance the light travels, the delay time and optical path distance through the device is precisely controller. Commercial fiber-based delay lines are built using single-mode, multimode or polarization maintaining (PM) fibers. These optical delay lines are offered in either manual or electrically controlled versions. Manual delay lines utilize either a lead screw or a micrometer to adjust the spacing of the optics. Electrically controlled delay lines are driven by a DC a servo motor with integrated encoders to monitor the motion. Electrically controlled delay lines may also be driven by a stepping motor. Computer control of a delay line is performed via an RS-232 interface or other electric connection using TTL input signals, for example. Commercial delay line devices are calibrated to provide the delay in order of picoseconds with micron and sub-micron level precision.

Figure 2:
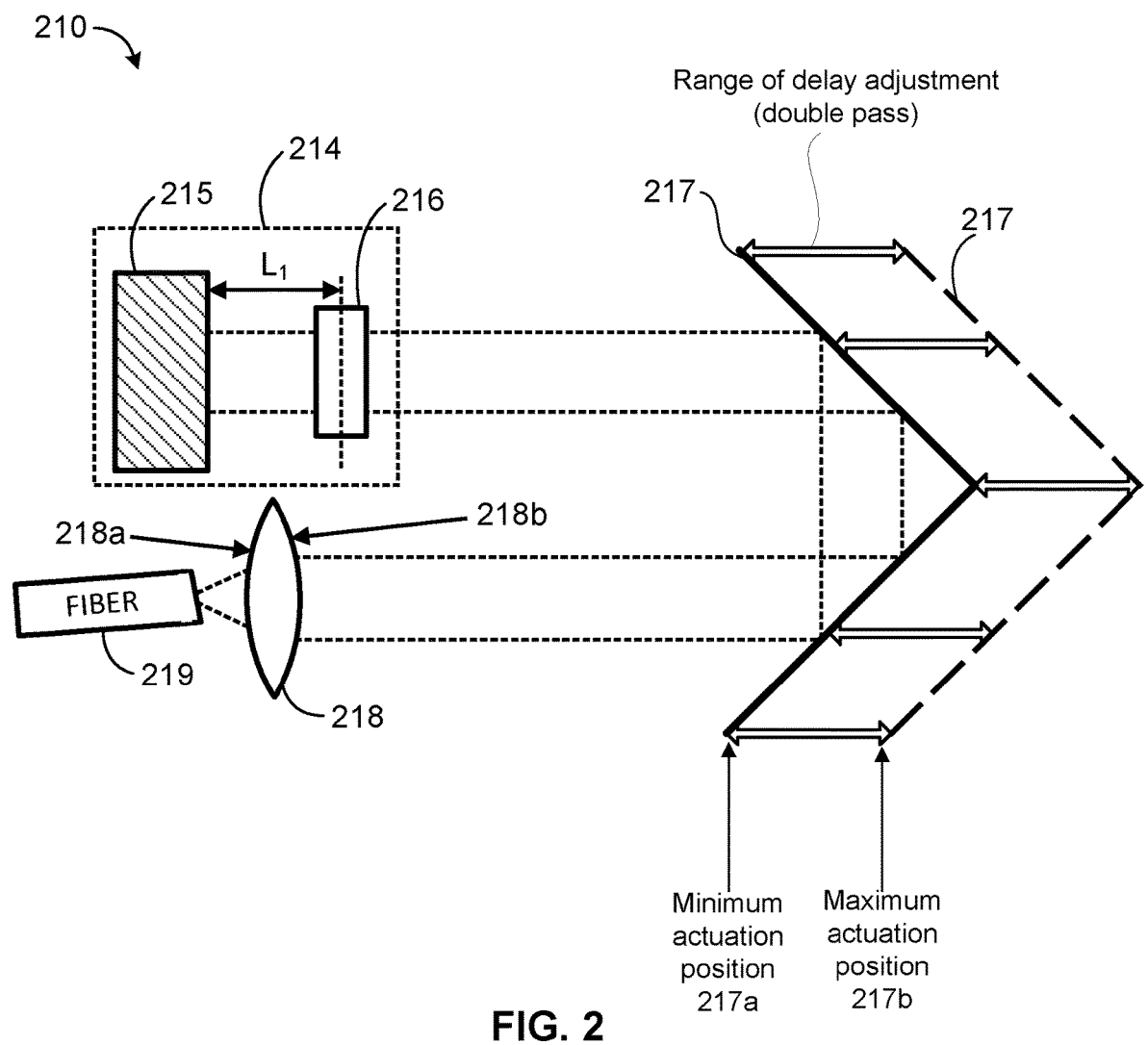
FIG. 2 illustrates an example embodiment of an optical delay line.

FIG. 2 illustrates a first embodiment of an optical delay line 210. The optical delay line 210 includes an optical fiber 219, a collimating lens 218, a main reflector 214, and a movable reflector 217. The main reflector 214 is a Faraday mirror, and the Faraday mirror includes a mirror 215 and a Faraday rotator 216. Also, the optical delay line includes a proximal reflector 218a and a distal reflector 218b. The proximal reflector 218a is the surface of the lens 218 that is closest to the distal end (or endface) of fiber 219, and the distal reflector 218b is the surface of the lens 218 that is farthest from the distal end of fiber 219. The fiber 219 endface in this example is angled or antireflection (AR) coated to reduce its reflection strength. In addition, the fiber itself can be angled with respect to the optical axis of the lens 218. For a fiber endface angled at 8 degrees, the beam in and out of it is at 4.3 degrees. To have the beam come out straight for efficient coupling with the lens 218, we need to tilt the fiber by 4.3 degrees.

The optical fiber 219 emits light that travels through the lens 218, and then reflects off of the movable reflector 217. The light then travels to the main reflector 214, which reflects the light back to the movable reflector 217. From the movable reflector 217, the reflected light travels back through the lens 218 to the optical fiber 219, which carries the reflected light to the other end of the optical fiber 219 (back to the beam splitter 104). The movable reflector 217 can be a corner cube mirror. Alternatively, the movable reflector 217 may be bypassed and the main reflector 214 can be collinear with lens 218. In that case, the lens 218 with respect to fiber 219 and/or Faraday rotator 216 can be adjustable. Control for adjusting the positions of the main reflector 214 (or in the alternate case adjusting the lens 218 or Faraday rotator 216) can be done using a stepper motor or a DC motor or manually using a precision translation stage. In other embodiments, adjustment control may be implemented using MEMS or Piezo actuators, but in this case the adjustment can be very small. Having a homing mechanism in combination with a position controller can be useful for high accuracy positioning. The homing mechanism can be an optical or magnetic homing switch.

The optical-path distance of the optical delay line is the total distance that the light travels from the distal end of optical fiber 219 to the mirror 215 then back to the optical fiber 219. Therefore, the optical delay is twice the distance that the movable reflector 217 moves within a range of delay adjustment. For example, in FIG. 2, for a 1 mm of movement of the reflector 217, the optical delay is 2 mm. Additionally, the zero-delay position is the minimum-actuation position 217a, which is the position of the movable reflector 217 that creates the shortest optical-path distance. Furthermore, the maximal-actuation position 217b is the position of the movable reflector 217 that creates the longest optical-path distance.

This embodiment of an optical delay line has a zero-delay position where the proximal reflector 218a and the distal reflector 218b are in higher order coherence revival modes, which reduces the signal from the proximal reflector 218a and the distal reflector 218b to below an OCT system's artifact level. The artifact level may be the same as the system's noise level or higher (a system designer may allow a certain level of artifacts in the image). System noise level is system specific and is well understood by someone skilled in the art. Artifact level refers to a signal that is superimposed on the image that is not from the imaged object space and sometime as a designer one may intentionally decide to allow such artifact that is larger than the noise floor and as such may appear in the image.

This embodiment of the optical delay line 210 has a point-and-return architecture, which may also be described as a reflection-type optical delay line. This architecture is often useful in OCT systems where the light of the interferometer propagates through similar materials (e.g., fiber and optical components with similar optical properties) in both the sample arm and the reference arm. This architecture may also provide a more-compact optical delay line and a faster delay-change speed because it provides twice as much optical delay for the same mechanical (spatial) delay as compared to a transmission-type optical delay line.

The Faraday rotator 216 may include a film of bismuth iron garnet with an external magnetic field applied by rare-earth magnets. A single pass through the Faraday rotator 216 normally rotates the polarization state of light by 45°. The mirror 215 returns light back at the same angle of incidence, and reflected light passing through the Faraday rotator 216 for a second time gets an additional 45° rotation. Therefore, light re-entering the optical fiber 219 has had its polarization state rotated by 90°, or orthogonal to the input polarization state, which provides the ability to minimize alterations to the polarization state that are induced by thermal and mechanical perturbations in the fiber 219. This is possible because the light travels through the same fiber 219 before entering and after exiting the Faraday rotator 216. Any perturbations to the polarization state that are caused by the optical fiber 219 are reversed during the return trip. Accordingly, the Faraday mirror 214 can compensate for any state-of-polarization changes that are caused by the optical fiber 219 without using a polarization-maintaining fiber. A unique property of a Faraday rotator mirror is that at any point along the optical path, the state of polarizations of the forward going and reflected light are always orthogonal to each other, regardless of the birefringence of the fiber. Therefore, the Faraday rotator 214 can help to eliminate any polarization sensitivity of the optical fiber 219. However, the optical delay line is not limited to the use of a Faraday mirror. Other optical materials or devices, such as a piezo electric element, an electro-optic modulator (EOM), an acousto-optic modulator (AOM), capable of rotating the polarization state of incident light by 90° (or orthogonal to the input polarization state) may be used.

Also, in FIG. 2, $L_1$ is the optical pathlength from the Faraday rotator 216 centerline to the mirror 215. Angling the Faraday rotator, and/or adding an antireflection-coating-entrance surface, or an antireflection-coating-exit surface can reduce reflection strengths. For simplicity, reflectors from the Faraday rotator 216 can be modeled as a single reflector with −60 dB (decibels (dB)) reflection strength. Because $L_1$ is fixed and does not depend on a delay adjustment, it is possible to eliminate image artifacts from the rotator reflection by placing the Faraday rotator 216 in between coherence modes. For example, in some embodiments $L_1$ is centered between a main mode and a first coherence-revival mode, which corresponds to half of the cavity optical pathlength. For example, for a light source having a cavity length of 39 mm, the value of L1 (distance from the Faraday rotator 216 centerline to the mirror 215) is 19.5 mm (e.g., 39 mm/2=19.5 mm). In this example, the goal is to place the component (Faraday rotator 216) at distance L1 where signal falloff is maximized while not increasing the length of the device too much and as such placing the component at about the middle between the main mode and the first coherence revival mode. In this example, it was discussed that the Faraday rotator can be placed farther than a minimum distance from the main reflector between main coherence mode and first coherence revival mode. The Faraday rotator can also be placed at a distance far enough such that it is already at, for example, the third coherence mode and is attenuated enough to no longer appear as an artifact.

Some embodiments of OCT systems, as well as other interferometric systems, include light sources that exhibit coherence (interference) revival. An external-cavity tunable laser is an example of such a light source. Coherence revival (also referred to as "interference revival") is a phenomenon where interference is observed not only when the reference arm and the sample arm are the same length, but also when the reference arm and the sample arm are mismatched by integer multiples of the laser's cavity length. Conceptually, coherence revival can be considered to be caused by the interference of sequential optical waveforms that emanate from sequential optical-laser cavity roundtrips. As such, for interferometers that have matched reference and sample arms, interference occurs not only for the reflections that fall within the coherence window of the system, but also for a "virtual cavity" which is replicated for all integer multiples of the laser's cavity length.

Additionally, dispersion and phase-modulation effects that occur in the laser cavity and that are common to both the sample arm and the reference arm do not affect an OCT signal; such is the case when the reference and sample arms are matched. However, when reflections are due to one of the virtual cavities, then coherence revival modes, laser-cavity dispersion, and phase modulation affect the OCT signal. Equation (1) describes the OCT-signal falloff as a function of depth for some embodiments of systems that have coherence revival:

$$f_{folloff}(z) = f_{filter}(z) * \left[ \exp\left(-\frac{|z|}{\zeta}\right)\left( \sum_{m=-\infty}^{\infty} \delta(z - m n_{eff} L) \right) \right], \quad (1)$$

where $n_{eff}$ is the effective refractive index of the cavity, and where L is the physical length of the cavity. As can be seen from equation (1), the falloff of a coherence-revival system is the convolution of the standard system's falloff, given by $f_{filter}(z)$, and a comb function with period equal to the cavity length $n_{eff}L$, multiplied by a double-sided coherence-revival-falloff envelope with a characteristic decay distance $\zeta = n_{eff}LF/\pi$, where F is the cavity Finesse value. From the factor $$\exp\left(-\frac{|z|}{\zeta}\right)$$

in equation (1), it can be seen that the coherence-revival-falloff envelope's effect on signal degradation increases as the imbalance between the reference arm and the sample arm increases or gets to be a larger integer multiple of the cavity length (a higher coherence revival mode). Also, since Finesse is usually defined as the ratio of separation of adjacent maxima to the half-width of individual fringes, a higher Finesse value F requires a higher imbalance between the reference arm and the sample arm to produce a similar level of fringe visibility degradation. Equation (1) does not include the effect of additional filtering or system losses.

Figure 3:
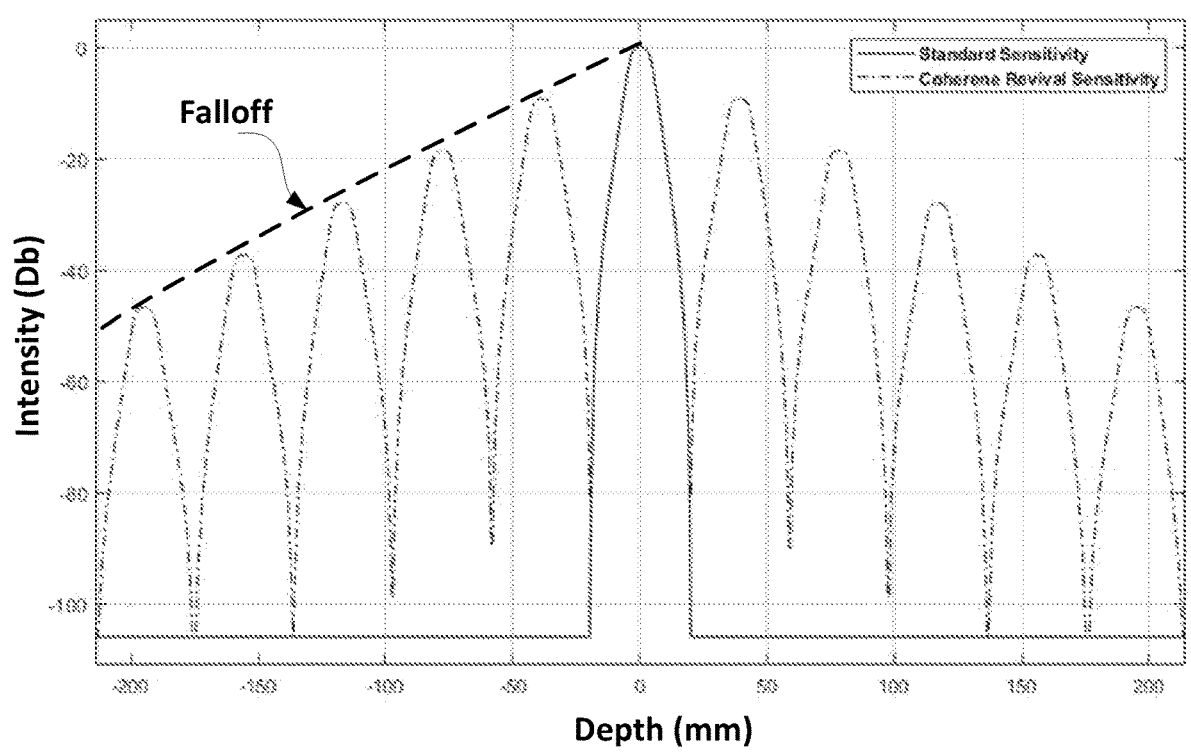
FIG. 3 shows the results of a simulation for a standard OCT system and for a coherence revival system that has parameters that are described in Table 1.

In order to demonstrate the issues that arise in coherence revival systems, a model was created to simulate signal fall-off for a conventional interferometric system and for a coherence-revival system. The model included effects of laser coherence, as well as electronic filtering on signal falloff as a function of depth (pathlength mismatch between the sample arm and the reference arm). The effect of a lateral beam profile was not included in the simulation. Table 1 lists the simulation parameters used for signal fall-off simulation. For simplicity, signal sensitivity was kept uniform at −106 dB. The finesse value F was approximately 2, which is typical of the type of laser used in the simulation. FIG. 3 shows the results of the simulation and Table 1 shows the parameters of the system.

TABLE 1

Signal-falloff-simulation Parameters

| Parameter | Unit | Value | Description |
|---|---|---|---|
| Exemplary System Sensitivity | dB | −106 | System noise floor equivalent |
| Observable Imaging Depth | mm | 7.2 | In air |
| Laser Coherence Length | mm | 25 | Double pass, single ended in air |
| Cavity Optical Pathlength | mm | 39 | Double pass in air |
| Digitizer Maximum Frequency | MHz | 480 | Twice maximum signal frequency content |
| Lowpass Cutoff Frequency | MHz | 150 | |
| Lowpass Filter Order | NA | 4th order | |
| Lowpass Filter Type | NA | Chebyshev | |
| Number of Simulated Modes | NA | 11 | From mode −5 to mode +5 |

Also, the artifacts in the system may include interference artifacts and optical-delay-line artifacts. Concerning interference artifacts, the signal falloff of a system that exhibits coherence revival includes signal interference from any two reflections, whether from the reference arm or the sample arm. The sample arm often has weak partial reflections (e.g., from optical interfaces at the proximal end or distal end of the optical probe), and thus interference from any two reflections in the sample arm will most likely fall below the smallest detectable signal, which is determined by the system's signal-falloff profile relative to the minimum detectable signal. Likewise, interference between any sample-arm reflection and any reference-arm reflection other than the main-reference-arm reflection will most likely be weaker than the minimum detectable signal. However, interference between any sample-arm reflection and the main reference-arm reflection may be (higher than the minimum detectable signal) strong enough to be detected, and therefore care has to be taken to ensure that no undesired reflections from the sample arm are present in the OCT image.

This can be achieved in a probe-based system where the probe is relatively long (20 cm to 300 cm) compared to the length required for the coherence-revival signal to degrade sufficiently, which depends on laser characteristics. In a probe-based system (catheter or endoscope system), reflections from the distal optics interfaces, which may be tailored so as to not saturate the detected signals, are sometimes desirable or tolerated and are common, whether the systems exhibit coherence revival, and whether the systems have an optical delay line. For non-probe-based sample arms, care has to be taken so that any undesired reflections fall in areas of high signal degradation, which can still be problematic if the reference-arm-reflector location needs to be varied from one setup to another. Other than the main reference reflection, interference between secondary reference-arm reflections and the main reference-arm reflection is usually too weak to detect if the separation between the reference-arm reflectors and the main reference reflector is long (20 cm to 300 cm or longer) as compared to the length required for the coherence revival signal to degrade sufficiently, which depends on system, especially laser, characteristics.

Additionally, concerning optical-delay-line artifacts, some manual variable optical delay lines (VDLs) and motorized optical delay lines (MDLs) have a very small separation between the main reflector and the other reflectors within the unit. These distances are often 2-3 cm or longer at a minimum, which is enough for the signal to completely degrade for a standard system, as can be seen from FIG. 3. However, this most likely will not be sufficient for a coherence revival system.

Table 2 includes some parameters from a simulation of delay line artifacts. The simulation used the embodiment of an optical delay line that is shown in FIG. 2, and the parameter values were taken from an example motorized optical delay line (MDL). For simplicity, weak reflectors were excluded from the simulation and only two of the strongest reflectors were included. In Table 2, "proximal reflection" refers to one of the two strong reflections closer to fiber endface, hence farthest from the mirror, main reflector; "distal reflection" refers to the other of the two strong reflections that is farthest from fiber endface. "Distal reflection minimum delay" refers to the optical pathlength from the distal reflector (218b) to the main reflector (mirror 215) when the MDL is at the minimum actuation position (217a), and "proximal reflection minimum delay" refers to the optical pathlength from the proximal reflector (218a) to the main reflector (mirror 215) when the MDL is at the minimum actuation position (217a). "Maximum delay adjustment" refers to the optical pathlength delay from the minimum actuation position (217a) to the maximum actuation position (217b) of the MDL. "Faraday rotator reflection" refers to the integrated reflection from the Faraday-rotator reflections.

TABLE 2

Motorized Optical-delay-line (MDL) Parameters

| Parameter | Unit | Value | Description |
| --- | --- | --- | --- |
| Proximal Reflection Return Loss | dB | −71 | Strength of reflection farthest from main reflector |
| Proximal Reflection Minimum Delay | mm | −74.1 | Double pass distance of reflection farthest from main reflector relative to main reflector when main reflector is at minimum delay, in air |
| Distal Reflection Return Loss | dB | −74 | Strength of reflection closest to main reflector |
| Distal Reflection Minimum Delay | mm | −64.0 | Double pass distance of reflection closest to main reflector relative to main reflector when main reflector is at minimum delay, in air |
| Maximum Delay Adjustment | mm | 30 | Available range of delay adjustment |
| Faraday Rotator Return Loss | dB | −60 | Strength of reflection from Faraday reflector |

Figure 4A:
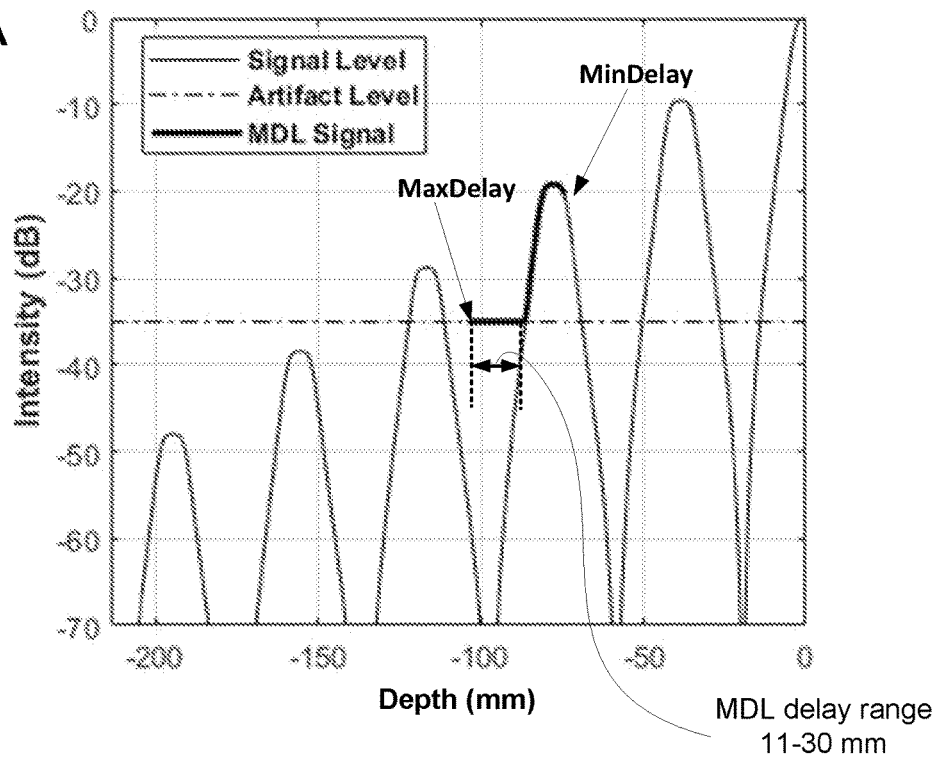
FIGS. 4A and 4B respectively show the signal levels from a proximal MDL reflector and from a distal MDL reflector superimposed on signal, noise, and artifact levels for a coherence revival system that has parameters that are described in Table 2.
Figure 4B:
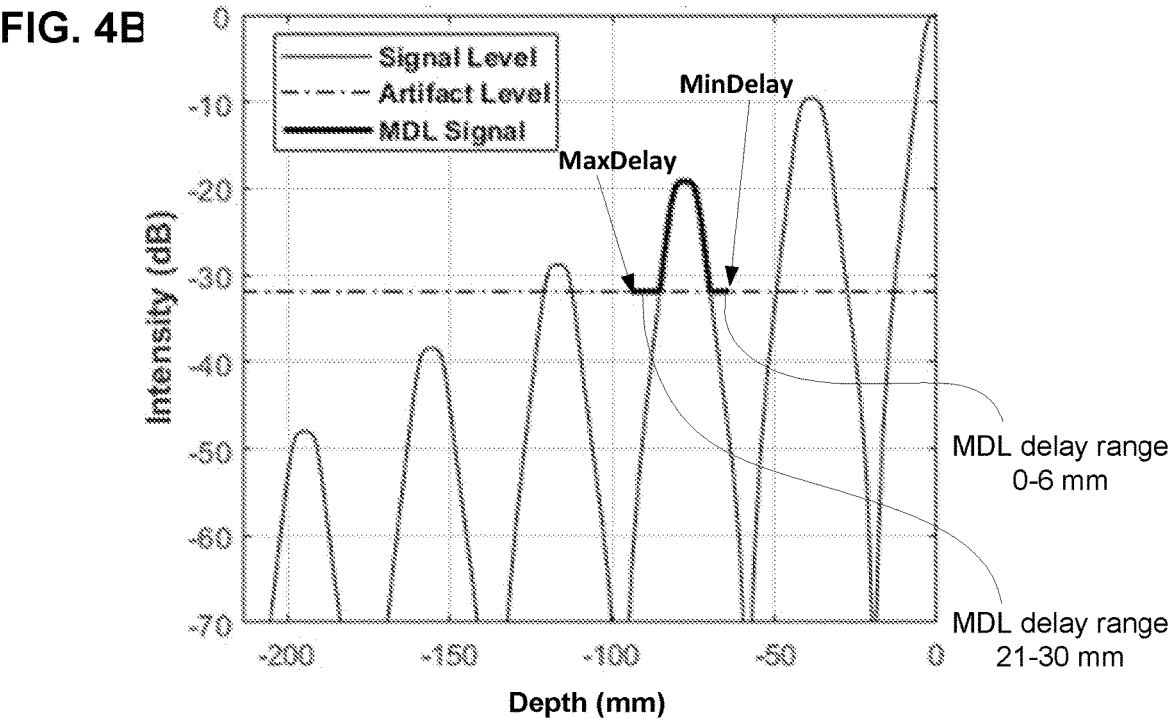

FIGS. 4A and 4B respectively show the signal levels from a proximal MDL reflector and from a distal MDL reflector superimposed on signal, noise, and artifact levels for a coherence revival system that has parameters that are described in Table 1.

In FIGS. 4A and 4B (as well as FIGS. 5A, 5B, 6A, 6B, 8A, and 8B), the x-axis refers to a double-pass optical path relative to the mirror (e.g., the mirror 215 in FIG. 2). The mirror position is zero on the x-axis, and the x-axis is positive for distances longer than the distance from the fiber endface to the mirror and is negative for distances that are shorter than the distance from the fiber endface to the mirror. In this example, all MDL reflectors are on the side of the mirror facing the fiber endface (i.e., the MDL reflectors are between the fiber endface and the mirror 215), and therefore their distances are negative. For an OCT sample object, the optical path length would be longer than that of the light reflected from the mirror, and the distance would thus be positive.

As shown by FIGS. 4A and 4B, for certain delay settings, MDL reflectors have signal values that are larger than the noise and artifact levels, and the noise and artifact levels may overlap with the desired object image. The artifacts from these reflectors can show up as broadened peaks, due to dispersion from being at the M=−2 coherence-revival mode, with an artifact-to-noise ratio as high as 15 dB for some delay values.

FIG. 4A also shows that, for these specific MDL parameters, the MDL delay range for artifact-free operation is from 11 mm to 30 mm for the proximal reflector, and FIG. 4B shows that the MDL delay range for artifact-free operation is from 0 mm to 6 mm and from 21 mm to 30 mm for the distal reflector. Not accounting for any offset between the zero delay for the desired signal and the zero delay for the undesired MDL coherence revival signal, it can be seen that the MDL in this example is useable artifact-free only over the range of 21 mm to 30 mm. This may limit the usability of some embodiments of this MDL. For example, one embodiment that uses a 1.46775 single-mode fiber is useful for correcting reference and sample mismatch by only ±3 mm.

Figure 5A:
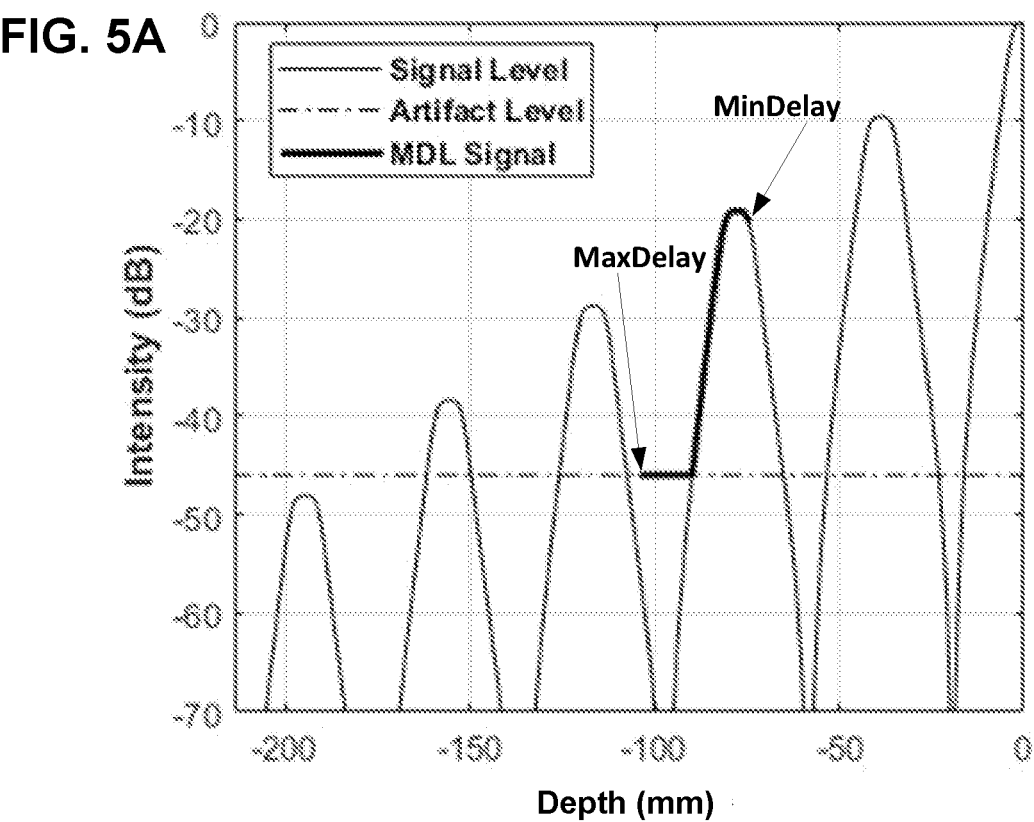
FIGS. 5A and 5B respectively show the signal levels overlaid on system signal and artifact levels in an embodiment where the value of each of the two strongest MDL reflectors was −60 dB.
Figure 5B:
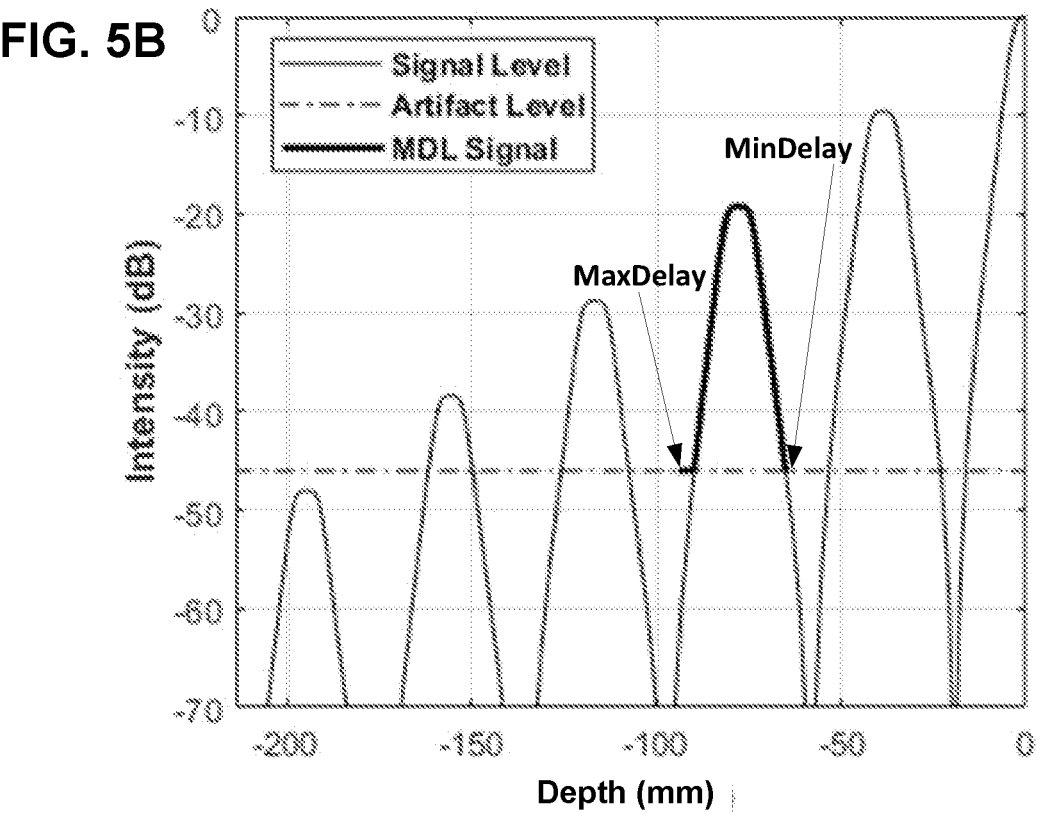

FIGS. 5A and 5B show the signal levels in an embodiment where the value of each of the two strongest MDL reflectors was −60 dB, and where the other parameters are described by Table 2. FIGS. 5A and 5B respectively show the signal levels from a proximal MDL reflector and from a distal MDL reflector superimposed on signal, noise, and artifact levels for a coherence revival system that has parameters that are described in Table 1. As shown by FIGS. 5A and 5B, due to dispersion being from the M=−2 coherence-revival mode, this embodiment would be rendered practically unusable because it can be seen that the proximal MDL in this example is useable artifact-free only over a few mm.

Furthermore, artifact locations within images change as the optical delay is adjusted to match the z-offset for different probes and different system conditions, which makes post-processing removal of the artifacts difficult or unfeasible.

Figure 6A:
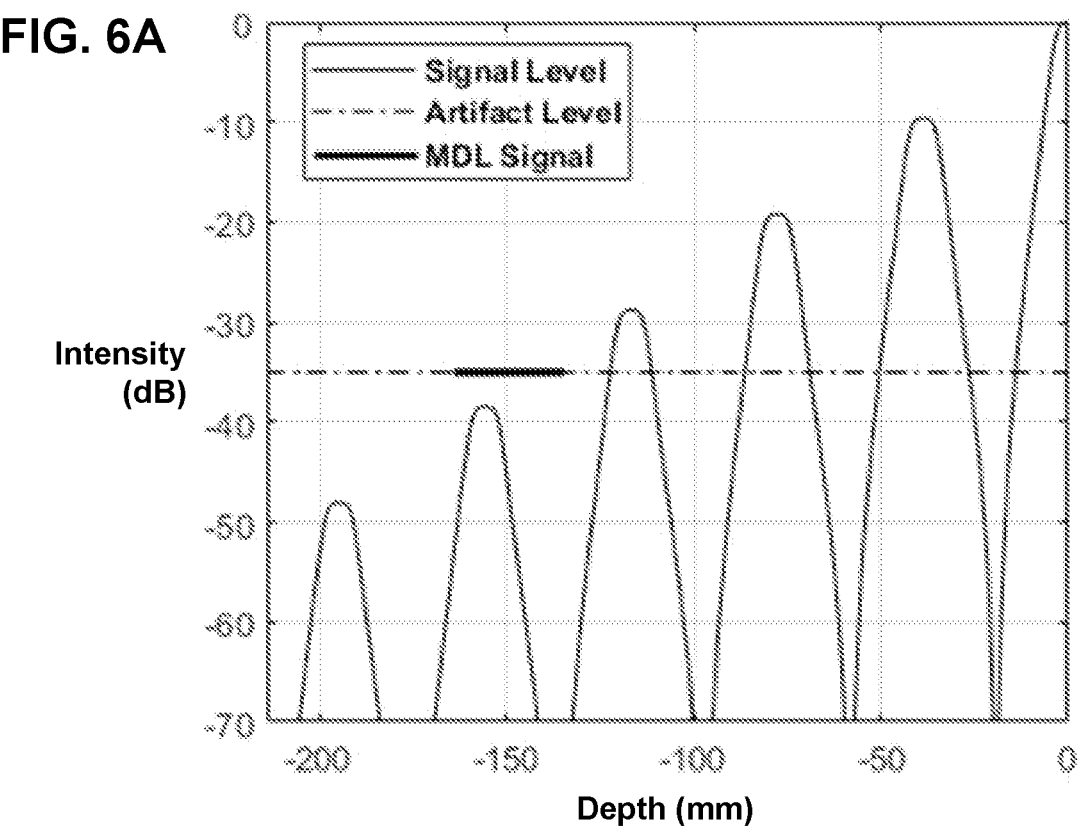
FIGS. 6A and 6B show the signal levels for an example embodiment.
Figure 6B:
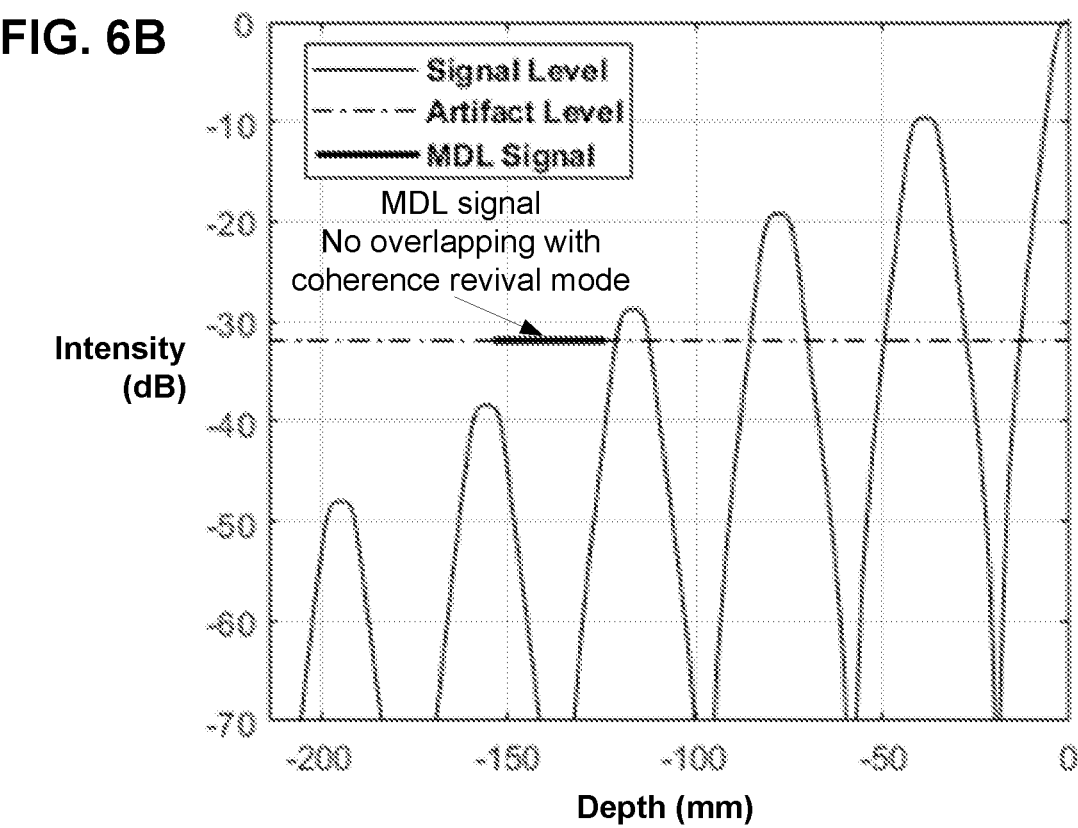

Therefore, some embodiments of the optical delay line in FIG. 2 have a zero-delay position that eliminates MDL artifacts completely. For example, for an embodiment that has the parameters from Table 2, adding an additional 60 mm to the zero-delay position is sufficient to completely eliminate MDL artifacts, as shown in FIGS. 6A and 6B. FIGS. 6A and 6B show the signal levels in an embodiment where the value of each of the two strongest MDL reflectors was −60 dB, and where the other parameters are described by Table 2. FIGS. 6A and 6B respectively show the signal levels from a proximal MDL reflector and from a distal MDL reflector superimposed on signal, noise, and artifact levels for a coherence revival system that has parameters that are described in Table 1. As shown by FIGS. 6A and 6B, due to dispersion being from the M=−4 coherence-revival mode, this embodiment would be more desirable than the system of FIGS. 4A-5B because it can be seen that either or both of the proximal MDL and distal MDL in this example is useable artifact-free over the entire delay range of 0 to 30 mm.

Figure 7:
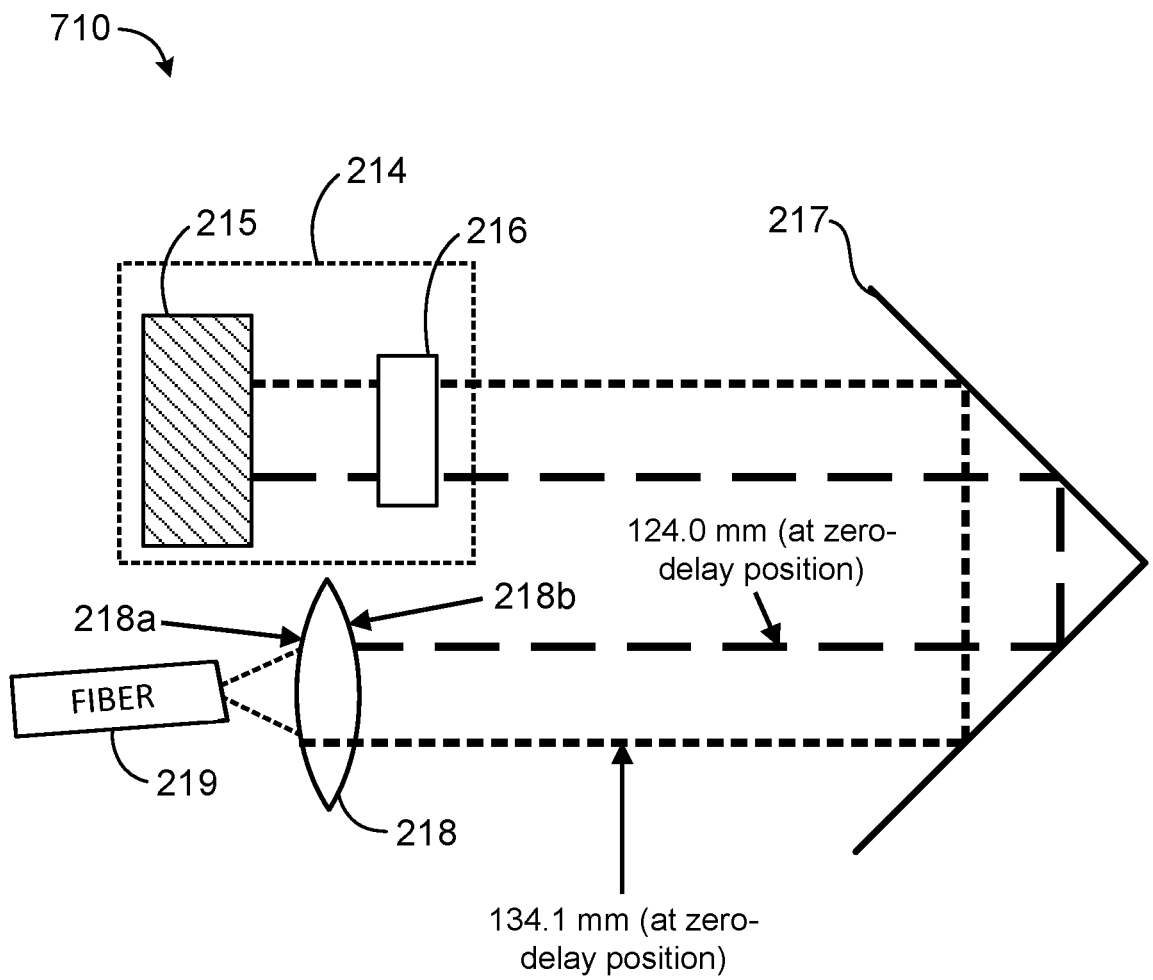
FIG. 7 illustrates an example embodiment of an optical delay line.

FIG. 7 illustrates an additional example embodiment of an optical delay line 710 of the point-and-return architecture. Similar to the example shown in FIG. 2, the optical delay line 710 includes an optical fiber 219, a lens 218, a main reflector 214, and a movable reflector 217. The main reflector 214 is a Faraday mirror, and the Faraday mirror includes a mirror 215 and a Faraday rotator 216. Also, the optical delay line 710 also includes a proximal reflector 218a and a distal reflector 218b. This optical delay line 710 has the parameters from Table 2. At the zero-delay position (minimum delay position or minimum actuation position), the distance from the proximal reflector 218a to the mirror 215 is 74.1+60=134.1 mm, and the distance from the distal reflector 218b to the mirror 215 is 64.0+60=124.0 mm.

Figure 8A:
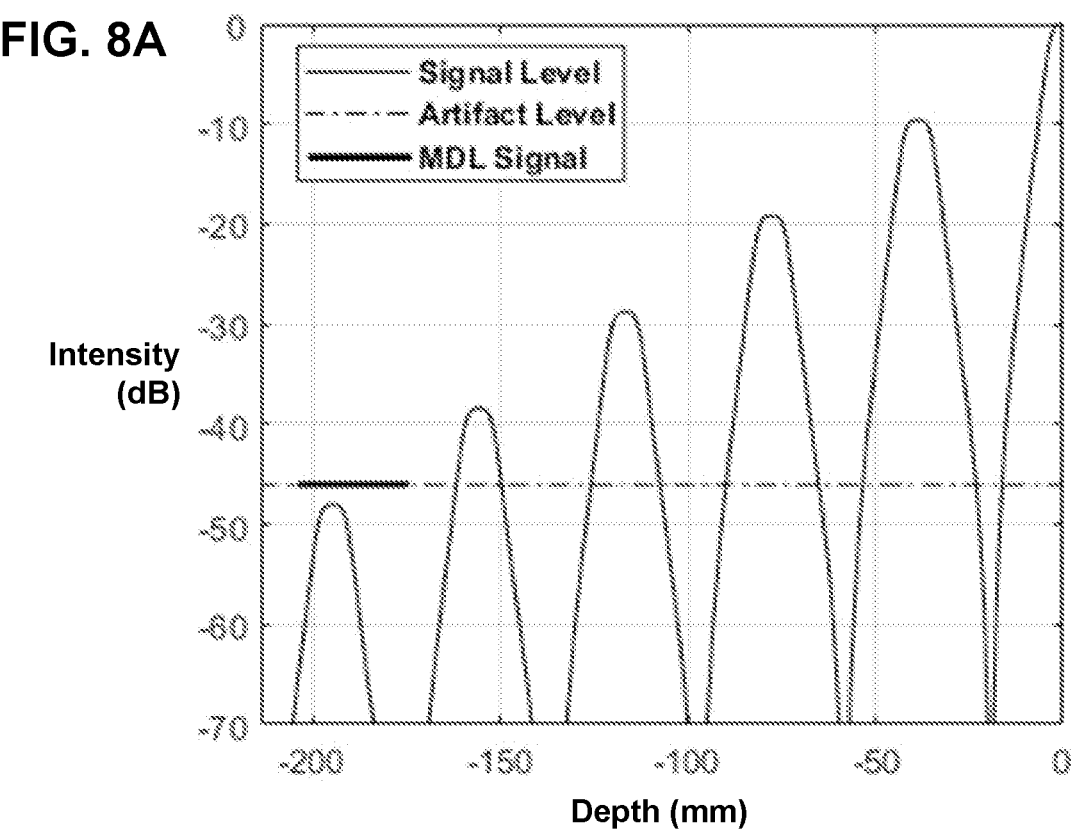
FIGS. 8A and 8B show the signal levels in an embodiment where the value of each of the two strongest MDL reflectors was −60 dB.
Figure 8B:
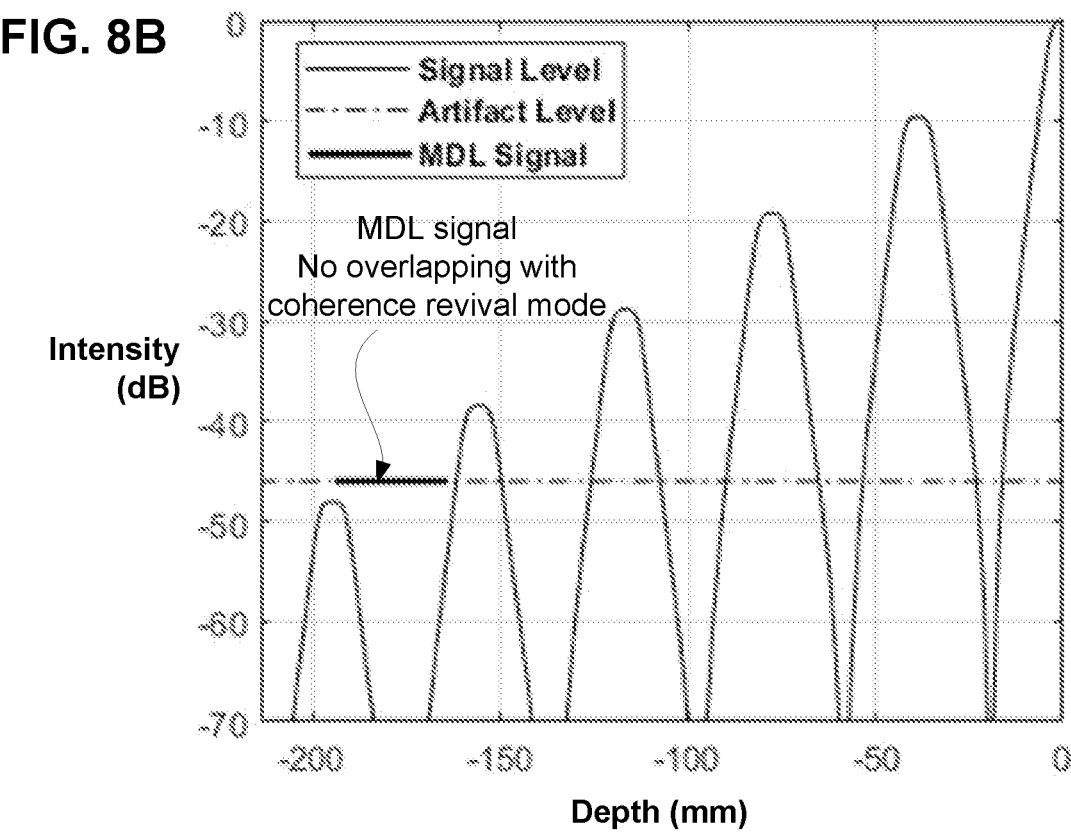

With the parameters of the optical delay line 710, when the strength of the MDL proximal and distal reflections is −60 dB, FIGS. 8A and 8B show that the minimum offset necessary to completely eliminate MDL artifacts is about 100 mm. More specifically, FIGS. 8A and 8B respectively show the signal levels from a proximal MDL reflector and from a distal MDL reflector superimposed on signal, noise, and artifact levels for a coherence revival system that has parameters that are described in Table 2. As shown by FIGS. 8A and 8B, due to dispersion being from the M=−5 coherence-revival mode, this embodiment would also be better than those of FIGS. 4A-5B because it can be seen that either or both of the proximal MDL and distal MDL signals are useable artifact-free.

Figure 9:
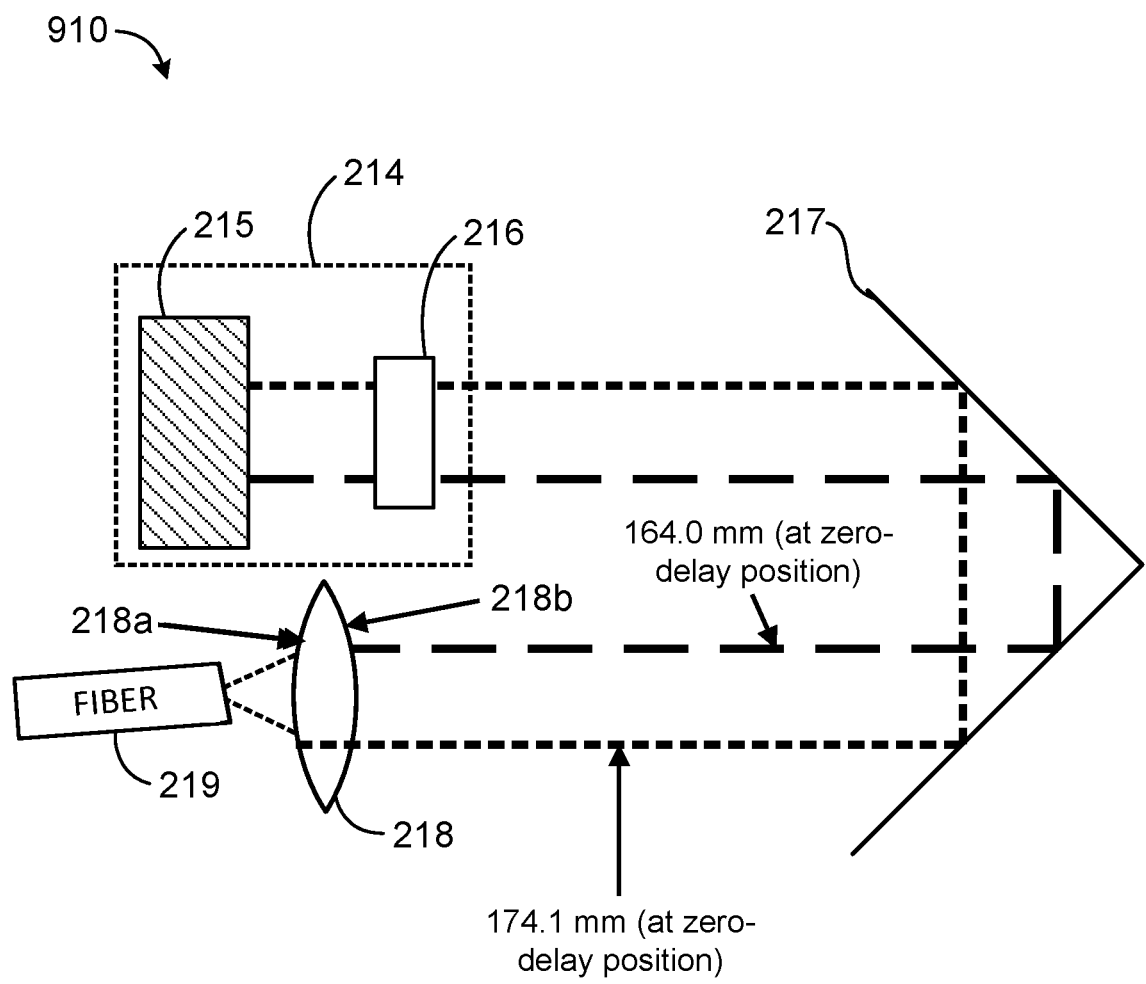
FIG. 9 illustrates an example embodiment of an optical delay line.

FIG. 9 illustrates a further example embodiment of an optical delay line 910 of the point-and-return architecture. This optical delay line 910 has the parameters from Table 2, and the strength of the proximal and distal reflections is −60 dB similar to that of FIGS. 7-8B. However, the example embodiment of FIG. 9 corresponds to a coherence revival system that has different parameters. At the zero-delay position, the distance from the proximal reflector 218a to the mirror 215 is 74.1+100=174.1 mm, and the distance from the distal reflector 218b to the mirror 215 is 64.0+100=164.0 mm. In this example, the minimum offset necessary to completely eliminate MDL artifacts can be even greater than 100 mm.

Embodiments that have different system parameters that the presented example embodiments have zero-delay positions that are configured according to the specific system parameters. Therefore, some embodiments may have different parameters and zero-delay positions.

Figure 10:
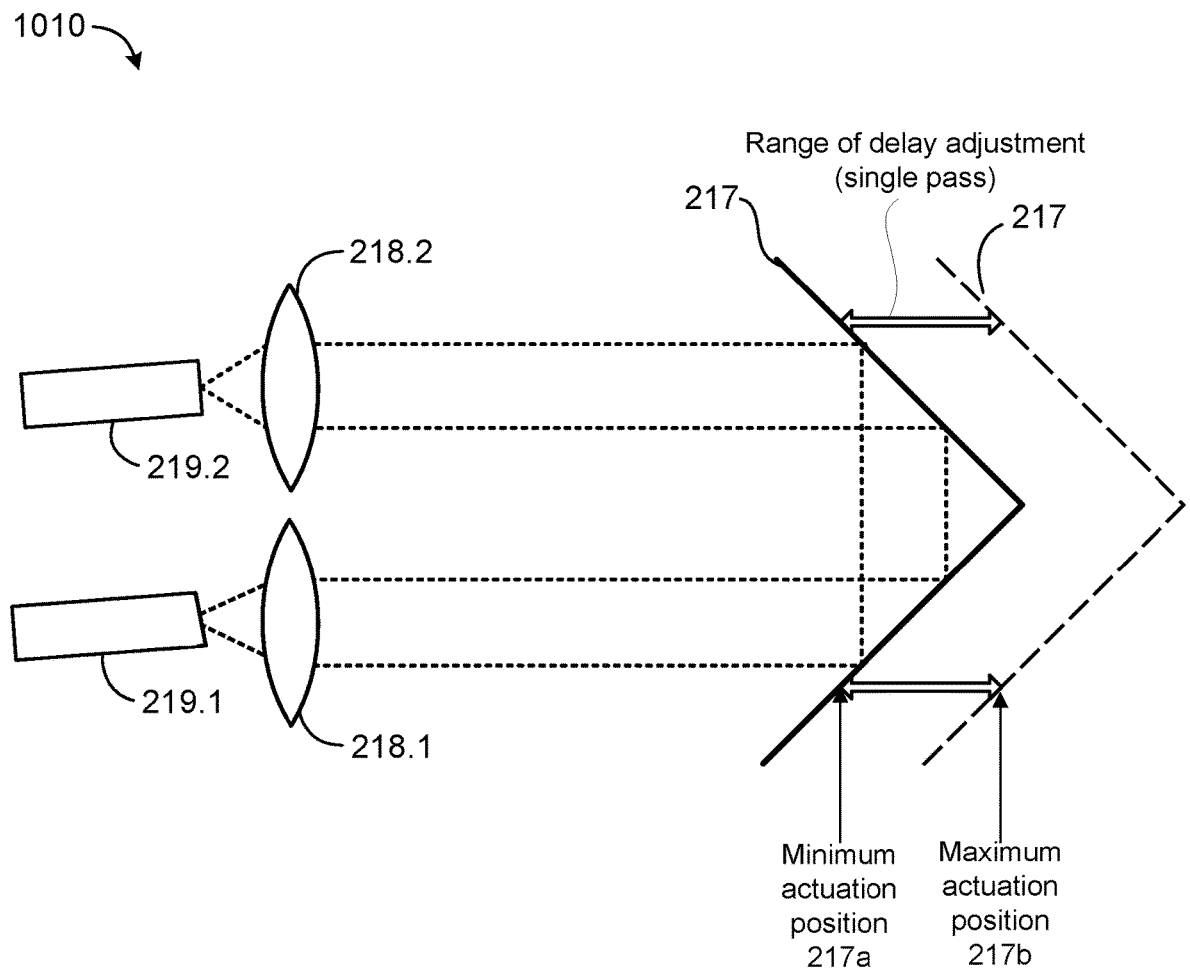
FIG. 10 illustrates an example embodiment of an optical delay line.

FIG. 10 illustrates a second embodiment of an optical delay line. This optical delay line 1010 has a transmission-type architecture. This architecture can be useful in applications where a higher delay resolution is advantageous because it allows for twice as much optical-delay resolution for the same mechanical-delay resolution as compared to a point-and-return-type architecture. The optical delay line 1010 includes a first optical fiber 219.1, a second optical fiber 219.2, a first lens 218.1, a second lens 218.2, and a movable reflector 217. The optical delay line 1010 may be configured so that the combination of the signals from any two single reflectors amounts to a signal that is lower than the minimum system artifact level. In this exemplary embodiment, the optical delay line 1010 may be a motorized optical delay line (MDL) where the movable reflector 217 can be moved between a minimum actuation position and a maximum actuation position of a range of delay adjustment.

Figure 11:
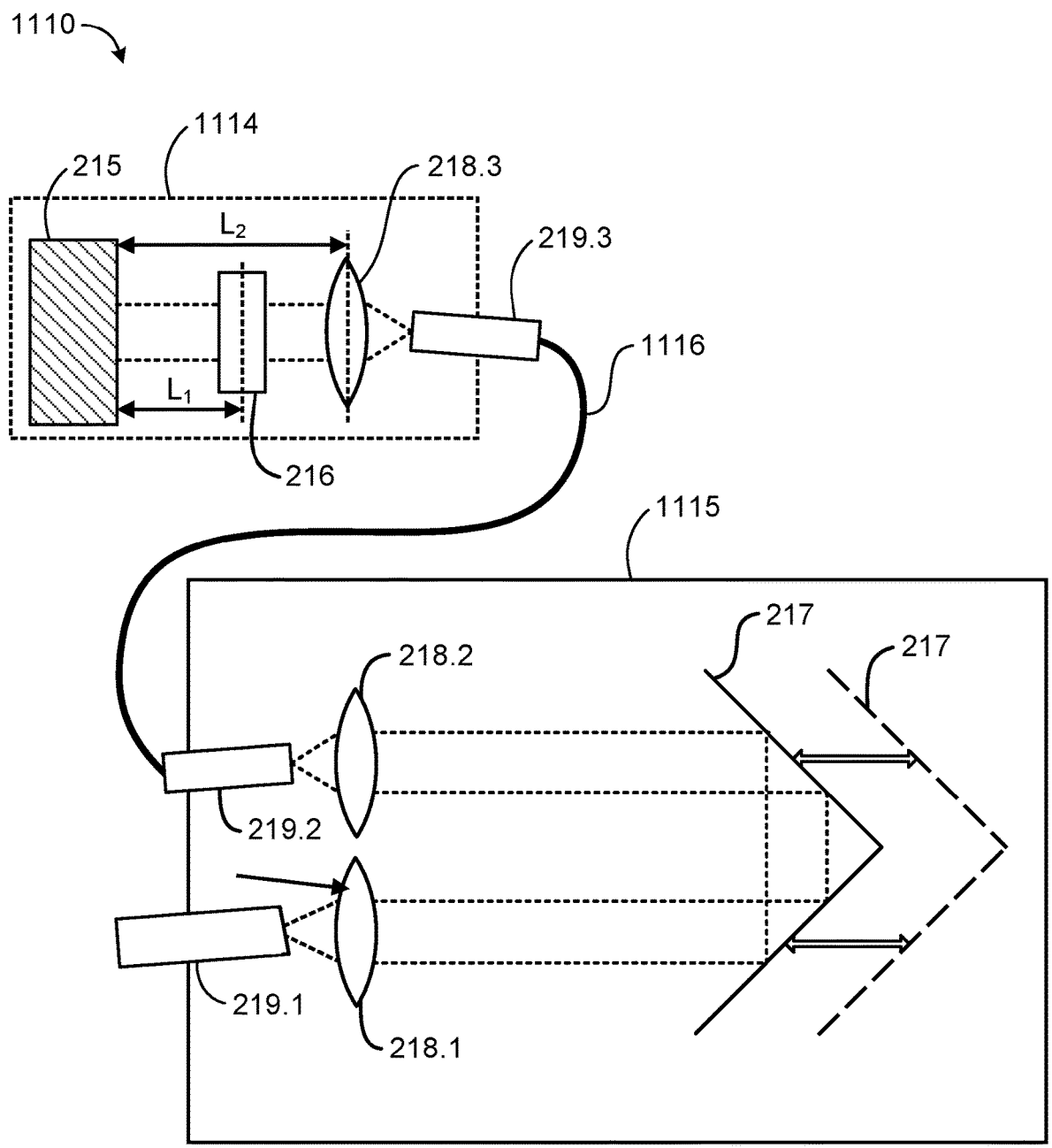
FIG. 11 illustrates an example embodiment of an optical delay line.

FIG. 11 illustrates a third embodiment of an optical delay line. In this embodiment, the optical delay line 1110 has a distributed-point-and-return architecture, which includes a main delay mechanism 1115 that is connected to the main reflector 1114 by a length of optical fiber 1116. The main delay mechanism 1115 has a transmission-type architecture similar to that in FIG. o0. The main delay mechanism 1115 includes a first optical fiber 219.1, a second optical fiber 219.2, a first lens 218.1, a second lens 218.2, and a movable reflector 217.

The main reflector 1114 includes a mirror 215, a Faraday rotator 216 at a distance L1 from mirror 215, and a lens 218.3 at a distance L2 from mirror 215 (L2>L1). In some embodiments the main reflector 1114 can be implemented as just a simple mirror or mirrored fiber endface (e.g., fiber optic Faraday rotator mirror). The optical delay line 1110 may be a motorized optical delay line (MDL). This embodiment has the advantage of keeping the minimum delay very small, limited only by mechanical build. The optical fiber 1116 between the main reflector 1114 and the main delay mechanism 1115 is sufficiently long to guarantee that reflections from the main delay mechanism 1115 are far enough from the mirror 215 such that the coherence artifact signal degrades to below an OCT system's artifact level. This can be accomplished by making the optical pathlength between the mirror 215 and the fiber 219.2 long enough. Because L1 and L2 are fixed and do not depend on a delay adjustment, it is easier to eliminate any image artifacts from the rotator reflection and the lens by placing the Faraday rotator 216 and the lens 218.3 in between coherence modes or beyond a minimum distance sufficient to guarantee that that the coherence artifact signal degrades to below an OCT system's artifact level. As noted above, the artifact level may be the same as the system's noise level or higher (a system designer may allow a certain level of artifacts in the image). In this example, the goal is to place the components of main reflector 1114 (Faraday rotator 216 the lens 218.3) at distances L1 and L2 where signal falloff is maximized while not increasing the length of the device too much and as such placing the main reflector 114 at about the middle between the main mode and the first coherence revival mode.

In some embodiments, an optical coherence tomography system comprises an interference optical system that operates to (i) receive and divide light from a light source into a first light, with which an object or sample is to be irradiated and which travels along a sample arm of the interference optical system, and a second reference light, (ii) send the second reference light along a reference arm that include an optical delay line for reflection off of a reference reflector of the interference optical system, and (iii) generate interference light by causing reflected or scattered light of the first light, with which the object or sample has been irradiated, and the reflected second reference light to combine or recombine, or to interfere, with each other, the interference light generating one or more interference patterns. The system also comprises at least one detector that operates to acquire the interference light or the one or more interference patterns to measure the interference or the one or more interference patterns between the combined or recombined light. Additionally, the optical delay line is designed such that it does not substantially introduce artifacts to an image.

In some embodiments, the light source exhibits coherence revival. And in some embodiments, the optical delay line is a motorized optical delay line, or the optical delay line has a point-and-return architecture.

In some embodiments, the optical delay line has a main reflector, one or more other reflectors, and delay-adjustment means, and the other reflectors are positioned farther than a minimum distance from the main reflector so as to have the signal drop below an acceptable image artifact level.

In some embodiments, the optical delay line has a Faraday rotator, and the Faraday rotator is located just beyond the length required for the main coherence mode signal to drop below the acceptable image artifact level. And in some embodiments, the Faraday rotator is placed in between the main coherence mode and the first coherence revival mode. Also, in some embodiments, the Faraday rotator is placed between the n and n+1 coherence revival modes, where n is greater than or equal to 1, or the Faraday rotator is placed farther than a minimum distance from the main reflector.

In some embodiments, the optical delay line has a delay-adjustment section separate from the main-reflector section, and the delay-adjustment section and the main-reflector section of the optical delay line may be connected by an optical fiber.

Finally, in some embodiments, the optical delay line is a transmission-type delay line with a plurality of reflectors, and the integrated signal from the interference of two or more reflectors is below the acceptable image artifact level.

As used herein, the conjunction "or" generally refers to an inclusive "or," though "or" may refer to an exclusive "or" if expressly indicated or if the context indicates that the "or" must be an exclusive "or."

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. An I/O interface can be used to provide communication interfaces to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

As shown in FIG. 1B, the computer 120 includes a central processing unit (CPU) 1201, a storage memory (RAM) 1202, a user input/output (I/O) interface 1203, and a system interface 1204 which are interconnected via a data bus 1205. The computer 120 can programmed to issue a command that can be transmitted to the various parts of the OCT system 100 upon receiving a user input via the user interface 1203. A touch panel screen in the display 130 can be included as part of the user interface 1203, but key board, mouse, joy-stick, ball controller, and foot pedal can also be included. The user can cause a command to be initiated to observe inside a lumen of a human body through the exemplary OCT system 100 using the user interface. For example, when the user inputs a command via the user interface 1203, the command is transmitted to the central processing unit CPU 1201 for execution thereby causing the CPU 1201 to issue a command via the system interface 1204 to one or more of the light source 101, the detector 107, the optical delay line 110, or PIU 105.

The CPU 1201 is comprised of one or more processors (microprocessors) configured to read and perform computer-executable instructions stored in the storage memory 1202. The computer-executable instructions may include program code for the performance of the novel processes, methods and/or calculations disclosed herein.

The computer 120 can be programmed to apply exemplary image processing such as noise reduction, coordinate distortion correction, contrast enhancement and so on. After or even during the image processing is performed, the data can be transmitted from the image processor to display 130. A liquid crystal display (LCD) can be used as the display 130.

The CPU 1201 is configured to read and perform computer-executable instructions stored in the storage memory 1202. The computer-executable instructions may include those for the performance of the methods, measurements, and/or calculations described herein. For example, CPU 1201 may receive signals from detector 107 and calculate, measure, or determine a signal falloff of the intensity of the interference light and/or the one or more interference patterns. Then, based on the signal falloff exhibiting coherence revival, the computer controls the optical delay line 110 to adjust the optical path difference so as not substantially introduce artifacts to an image of the object or sample.

The storage memory 1202 includes one or more computer readable and/or writable media, which may include, for example, a magnetic disc (e.g., a hard disk), an optical disc (e.g., a DVD, a Blu-ray), a magneto-optical disk, semiconductor memory (e.g., a non-volatile memory card, flash memory, a solid state drive, SRAM, DRAM), an EPROM, an EEPROM, etc. Storage/RAM 402 may store computer-readable data and/or computer-executable instructions.

The system interface 1204 provides communication interfaces to input and output devices, which may include a keyboard, a display, a mouse, a printing device, a touch screen, a light pen, an optical storage device, a scanner, a microphone, a camera, a drive, communication cable and a network (either wired or wireless).

The detector interface also provides communication interfaces to input and output devices. The detector may include, for example a photomultiplier tube (PMT), a photodiode, an avalanche photodiode detector (APD), a charge-coupled device (CCD), multi-pixel photon counters (MPPC), or other. Also, the function of detector may be realized by computer executable instructions (e.g., one or more programs) recorded on a Storage/RAM.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An optical coherence tomography (OCT) system, comprising:
    an interferometer configured to:
        (i) receive and divide light from a light source into a first beam with which an object or sample is to be irradiated and which travels along a sample arm of the interferometer and a second beam which travels along a reference arm of the interferometer,
        (ii) send the second beam along the reference arm for reflection off of a reference reflector of the interferometer, and
        (iii) generate interference light by causing the reflected second beam to combine or recombine and/or to interfere with reflected or scattered light of the first beam with which the object or sample has been irradiated, the interference light generating one or more interference patterns;
    at least one detector that operates to detect intensities of the interference light and/or the one or more interference patterns,
    a processor configured to measure a signal falloff of the intensity of the interference light and/or the one or more interference patterns; and
    an optical delay line configured to adjust an optical path difference of the sample and reference arms of the interferometer,
    wherein, based on the signal falloff exhibiting coherence revival, the processor controls the optical delay line to adjust the optical path difference so as not substantially introduce artifacts to an image of the object or sample.

2. The OCT system of claim 1, wherein the light source is a swept-source laser which exhibits coherence revival.

3. The OCT system of claim 1, wherein the optical delay line is a motorized optical delay line.

4. The OCT system of claim 1, wherein the optical delay line has a point and return architecture.

5. The OCT system of claim 4,
    wherein the optical delay line includes a single coupling end which is connected to an optical fiber of the reference arm,
    wherein the optical fiber and/or an endface of the optical fiber is angled with respect to the optical axis of a collimating lens arranged at coupling end of the optical delay line.

6. The OCT system of claim 1, wherein the optical delay line comprises:
    a main reflector,
    one or more partial reflectors, and
    a delay adjustment element,
    wherein the one or more partial reflectors are positioned farther than a minimum distance from the main reflector so as to have the intensity of an interference signal thereof drop below an acceptable image artifact level.

7. The OCT system of claim 6,
wherein the main reflector includes a mirror and a Faraday rotator, and
wherein the Faraday rotator is placed at a distance immediately beyond the length required for the main coherence mode signal to drop below the acceptable image artifact level.

8. The OCT system of claim 7, wherein the Faraday rotator is placed at a distance corresponding to in between the main coherence mode and the first coherence revival mode.

9. The OCT system of claim 7, wherein the Faraday rotator is placed at a distance corresponding to in between the n and n+1 coherence revival modes, where n is greater than or equal to 1.

10. The OCT system of claim 7, wherein the Faraday rotator is placed farther than a minimum distance from the main reflector.

11. The OCT system of claim 1, wherein the optical delay line includes a main reflector section and a delay adjustment section separate from the main reflector section.

12. The OCT system of claim 11, wherein the delay adjustment section and the main reflector section of the optical delay line are connected by an optical fiber.

13. The OCT system of claim 12,
wherein, based on the signal falloff exhibiting coherence revival, the processor controls the optical delay line to adjust the optical path difference based on one or more of a proximal reflection, a distal reflection, and a Faraday-rotator reflection caused by the reference beam within the optical delay line,
wherein the proximal reflection refers to a reflection caused by a first partial reflector arranged farthest from the fixed main reflector, the distal reflection refers to a reflection caused by a second partial reflector arranged between the first partial reflector and the movable reflector, and the Faraday-rotator reflection refers to an integrated reflection from reflections of the fixed main mirror and the Faraday-rotator.

14. The OCT system of claim 11, wherein
the main reflector includes a mirror, a Faraday rotator, and one or more secondary reflectors; and
the delay adjustment section includes a movable reflector and one or more lenses.

15. The OCT system of claim 1, wherein the optical delay line is a transmission type delay line with a plurality of partial reflectors, and
wherein an integrated signal from the interference of plurality of partial reflectors is below the acceptable image artifact level.

16. The OCT system of claim 1,
wherein the optical delay line includes
a fixed main reflector having a mirror and a Faraday rotator,
one or more partial reflectors, and
a movable reflector,
wherein, based on the signal falloff exhibiting coherence revival, the processor is configured to control the movable reflector to move between a minimum actuation position and a maximum actuation position so as to change the optical pathlength of the reference arm.

17. The OCT system of claim 16, wherein the optical delay line has a maximum delay adjustment corresponding to a double pass of the reference beam from the minimum actuation position to the maximum actuation position.

18. The OCT system of claim 1,
wherein the optical delay line is arranged at the distal end of the reference arm,
wherein the optical delay line includes in this order from its distal end to its proximal end:
a fixed main reflector having a mirror and a Faraday rotator,
a movable reflector, and
one or more partial reflectors.

19. A method for eliminating or significantly reducing artifacts in optical coherence tomography (OCT), comprising:
dividing light from a light source into a first beam with which an object or sample is to be irradiated and which travels along a sample arm of an interferometer and a second beam which travels along a reference arm of the interferometer,
sending the second beam along the reference arm for reflection off of a reference reflector of the interferometer, and
generating interference light by causing the reflected second beam to combine or recombine and/or to interfere with reflected or scattered light of the first beam with which the object or sample has been irradiated, the interference light generating one or more interference patterns;
detecting, using at least one detector, intensities of the interference light and/or the one or more interference patterns,
measuring a signal falloff of the intensity of the interference light and/or the one or more interference patterns; and
adjusting, using an optical delay line, an optical path difference between the sample and reference arms of the interferometer,
wherein, based on the signal falloff exhibiting coherence revival, a processor controls the optical delay line to adjust the optical path difference so as not substantially introduce artifacts to an image of the object or sample.

* * * * *